(12) United States Patent
Song et al.

(10) Patent No.: US 11,557,315 B2
(45) Date of Patent: Jan. 17, 2023

(54) ENERGY ASSISTED MAGNETIC RECORDING HEAD HAVING IMPROVED AREAL DENSITY CAPABILITY

(71) Applicant: Western Digital Technologies, Inc., San Jose, CA (US)

(72) Inventors: Suping Song, Fremont, CA (US); Zhanjie Li, Pleasanton, CA (US); Terence Lam, Cupertino, CA (US); Changqing Shi, San Ramon, CA (US); Lijie Guan, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/644,231

(22) Filed: Dec. 14, 2021

(65) Prior Publication Data

US 2022/0108715 A1 Apr. 7, 2022

Related U.S. Application Data

(62) Division of application No. 16/906,480, filed on Jun. 19, 2020, now Pat. No. 11,227,627.

(Continued)

(51) Int. Cl.
*G11B 5/235* (2006.01)
*G11B 5/23* (2006.01)
(Continued)

(52) U.S. Cl.
CPC ............ *G11B 5/235* (2013.01); *G11B 5/1278* (2013.01); *G11B 5/23* (2013.01); *G11B 5/314* (2013.01);
(Continued)

(58) Field of Classification Search
None
See application file for complete search history.

(56) References Cited

U.S. PATENT DOCUMENTS 8,325,442 B2 12/2012 Koui et al.
8,467,148 B2 6/2013 Iwasaki et al.
(Continued)

FOREIGN PATENT DOCUMENTS

WO 2018111356 A1 6/2018

OTHER PUBLICATIONS

Zhu et al. "Microwave Assisted Magnetic Recording Utilizing Perpendicular Spin Torque Oscillator with Switchable Perpendicular Electrodes," IEEE Transactions on Magnetics, vol. 46, No. 3, Mar. 2000, pp. 751-757.

*Primary Examiner* — Craig A. Renner
(74) *Attorney, Agent, or Firm* — Patterson & Sheridan, LLP; Steven H. VerSteeg

(57) ABSTRACT

The present disclosure generally relates to a magnetic media drive employing a magnetic recording head. The magnetic recording head comprises a main pole, an EAMR stack disposed on the main pole, and a trailing shield disposed on the EAMR stack. The EAMR stack comprises a seed layer disposed on the main pole, a spin torque layer disposed on the seed layer, and a spacer layer disposed on the spin torque layer. At least one surface of the spacer layer in contact with the spin torque layer has a smaller or reduced area than the spin torque layer. The at least one surface of the spacer layer in contact with the spin torque layer is recessed from a media facing surface and has a smaller cross-track width than the spin torque layer and a smaller width in the stripe height direction than the spin torque layer.

20 Claims, 11 Drawing Sheets

Related U.S. Application Data

(60) Provisional application No. 62/876,339, filed on Jul. 19, 2019.

(51) Int. Cl.
| | | |
|---|---|---|
| *G11B 5/31* | (2006.01) | |
| *G11B 5/127* | (2006.01) | |
| *G11B 5/39* | (2006.01) | |
| *G11B 5/00* | (2006.01) | |
| *G11B 5/48* | (2006.01) | |
| *G11B 5/245* | (2006.01) | |

(52) U.S. Cl.
CPC .......... *G11B 5/3146* (2013.01); *G11B 5/2457* (2013.01); *G11B 5/3909* (2013.01); *G11B 5/3912* (2013.01); *G11B 5/4826* (2013.01); *G11B 2005/0018* (2013.01); *G11B 2005/0024* (2013.01)

(56) References Cited

U.S. PATENT DOCUMENTS

| | | |
|---|---|---|
| 9,099,107 B1 | 8/2015 | Igarashi et al. |
| 9,202,484 B1 | 12/2015 | Watanabe et al. |
| 10,014,012 B1 | 7/2018 | Song et al. |
| 10,121,497 B1 | 11/2018 | Takahashi et al. |
| 10,157,632 B1 | 12/2018 | Song et al. |
| 10,181,334 B1 | 1/2019 | Song et al. |
| 10,210,888 B1 | 2/2019 | Li et al. |
| 10,325,618 B1 | 6/2019 | Wu et al. |
| 10,943,611 B1 | 3/2021 | Freitag et al. |
| 2011/0205655 A1 | 8/2011 | Shimizu et al. |
| 2011/0216435 A1* | 9/2011 | Shiimoto et al. ........ G11B 5/02 360/59 |
| 2012/0126905 A1 | 5/2012 | Zhang et al. |
| 2014/0211340 A1 | 7/2014 | Sugiura et al. |
| 2015/0092292 A1 | 4/2015 | Furukawa et al. |
| 2017/0092304 A1 | 3/2017 | Koizumi et al. |
| 2017/0236537 A1 | 8/2017 | Murakami et al. |

\* cited by examiner

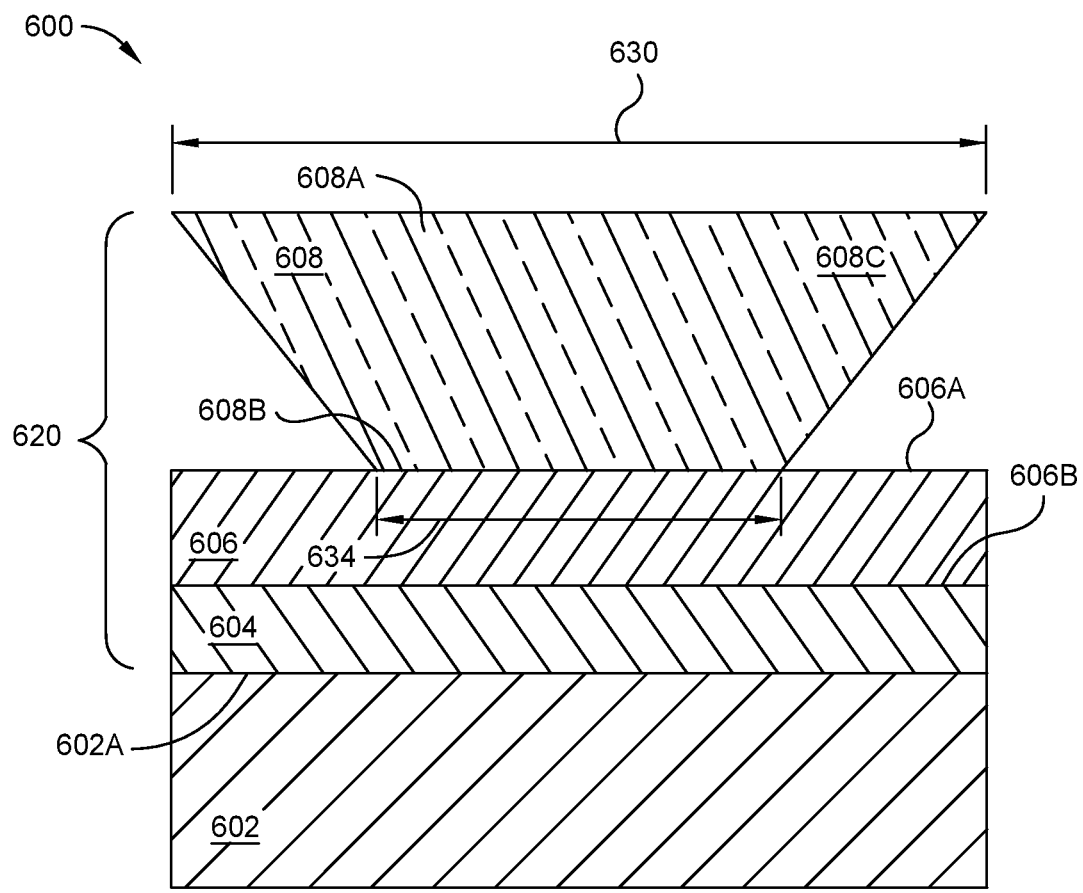
FIG. 6D
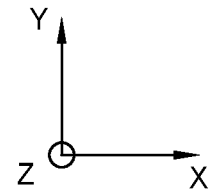

ENERGY ASSISTED MAGNETIC RECORDING HEAD HAVING IMPROVED AREAL DENSITY CAPABILITY

CROSS-REFERENCE TO RELATED APPLICATIONS

This application is a divisional of U.S. patent application Ser. No. 16/906,480, filed Jun. 19, 2020, which application claims benefit of U.S. provisional patent application Ser. No. 62/876,339, filed Jul. 19, 2019, both of which are herein incorporated by reference.

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, energy assisted magnetic recording (EAMR) has been studied as a recording method to improve the areal density of a magnetic read/write device, such as a hard disk drive (HDD). EAMR enabled magnetic recording heads utilize an EAMR stack, including a seed layer, at least one magnetic layer, such as a spin torque layer (STL) that is magnetized by a bias current during operation, and a spacer layer, disposed between the trailing shield and the main pole to improve write field and/or field gradient, leading to better areal density capability (ADC). Typically, the seed layer, STL, and spacer layer all have the same size, shape, and cross-section area.

When a bias current is applied from a trailing shield through the EAMR stack to the main pole, the STL switches and provides a DC magnetic field to the recording medium. The DC magnetic field may enhance the write-ability, and thus, high quality recording by EAMR may be achieved. However, when a high amount of bias current is applied, the magnetization of a hot seed layer or notch layer of the trailing shield becomes tilted due to a strong local spin transfer torque from the STL, resulting in performance degradation. An increased bias current density at the hot seed layer or notch layer of the trailing shield can additionally slow down the switching of the magnetization of the STL, further degrading performance. Therefore, there is a need in the art for an improved magnetic recording head design.

SUMMARY OF THE DISCLOSURE

The present disclosure generally relates to a magnetic media drive employing a magnetic recording head. The magnetic recording head comprises a main pole, an EAMR stack disposed on the main pole, and a trailing shield disposed on the EAMR stack. The EAMR stack comprises a seed layer disposed on the main pole, a spin torque layer disposed on the seed layer, and a spacer layer disposed on the spin torque layer. At least one surface of the spacer layer in contact with the spin torque layer has a smaller or reduced area than the spin torque layer. The at least one surface of the spacer layer in contact with the spin torque layer is recessed from a media facing surface and has a smaller cross-track width than the spin torque layer and a smaller width in the stripe height direction than the spin torque layer.

In one embodiment, a magnetic recording head comprises a main pole, a seed layer disposed on the main pole, a spin torque layer disposed on the seed layer, the spin torque layer having a first cross-track width, and a spacer layer disposed on the spin torque layer, the spacer layer having a second cross-track width less than the first cross-track width.

In another embodiment, a magnetic recording head comprises a main pole, a seed layer disposed on the main pole, a spin torque layer disposed on the seed layer, the spin torque layer having a first width in a stripe height direction, a spacer layer disposed on the spin torque layer, the spacer layer having a second width in a stripe height direction less than the first width in the stripe height direction, and a trailing shield disposed on the spacer layer.

In another embodiment, a magnetic recording head comprises a main pole, a seed layer disposed on the main pole, a spin torque layer disposed on the seed layer, and a spacer layer disposed on the spin torque layer, the spacer layer having a trapezoidal shape. A first surface of the spacer layer disposed adjacent to and in contact with the spin torque layer has a first cross-track width less than a second cross-track width of a second surface of the spacer layer disposed opposite the first surface of the spacer layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6D illustrate various views of a magnetic recording head, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic media drive employing a magnetic recording head. The magnetic recording head comprises a main pole, an EAMR stack disposed on the main pole, and a trailing shield disposed on the EAMR stack. The EAMR stack comprises a seed layer disposed on the main pole, a spin torque layer disposed on the seed layer, and a spacer layer disposed on the spin torque layer. At least one surface of the spacer layer in contact with the spin torque layer has a smaller or reduced area than the spin torque layer. The at least one surface of the spacer layer in contact with the spin torque layer is recessed from a media facing surface and has a smaller cross-track width than the spin torque layer and a smaller width in the stripe height direction than the spin torque layer.

Figure 1:
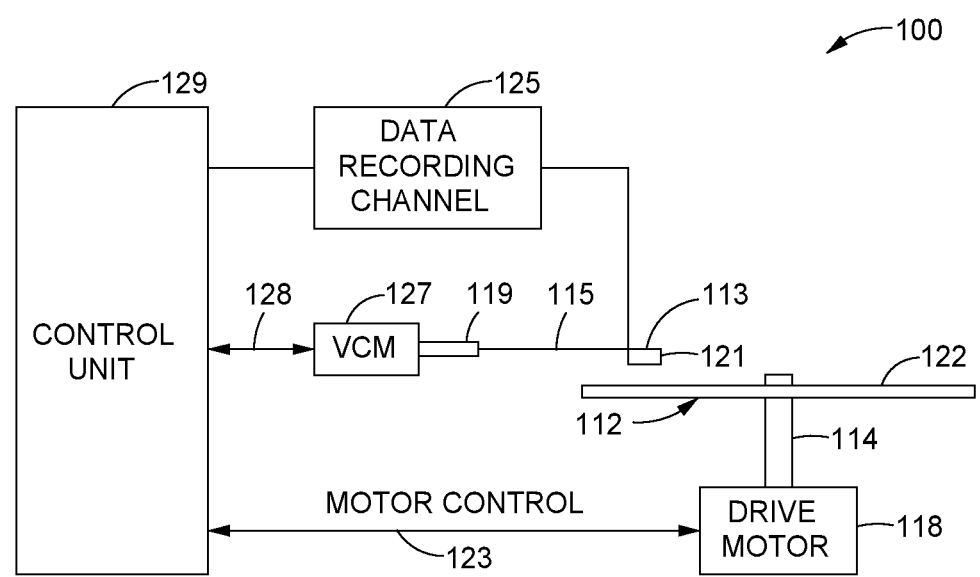
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
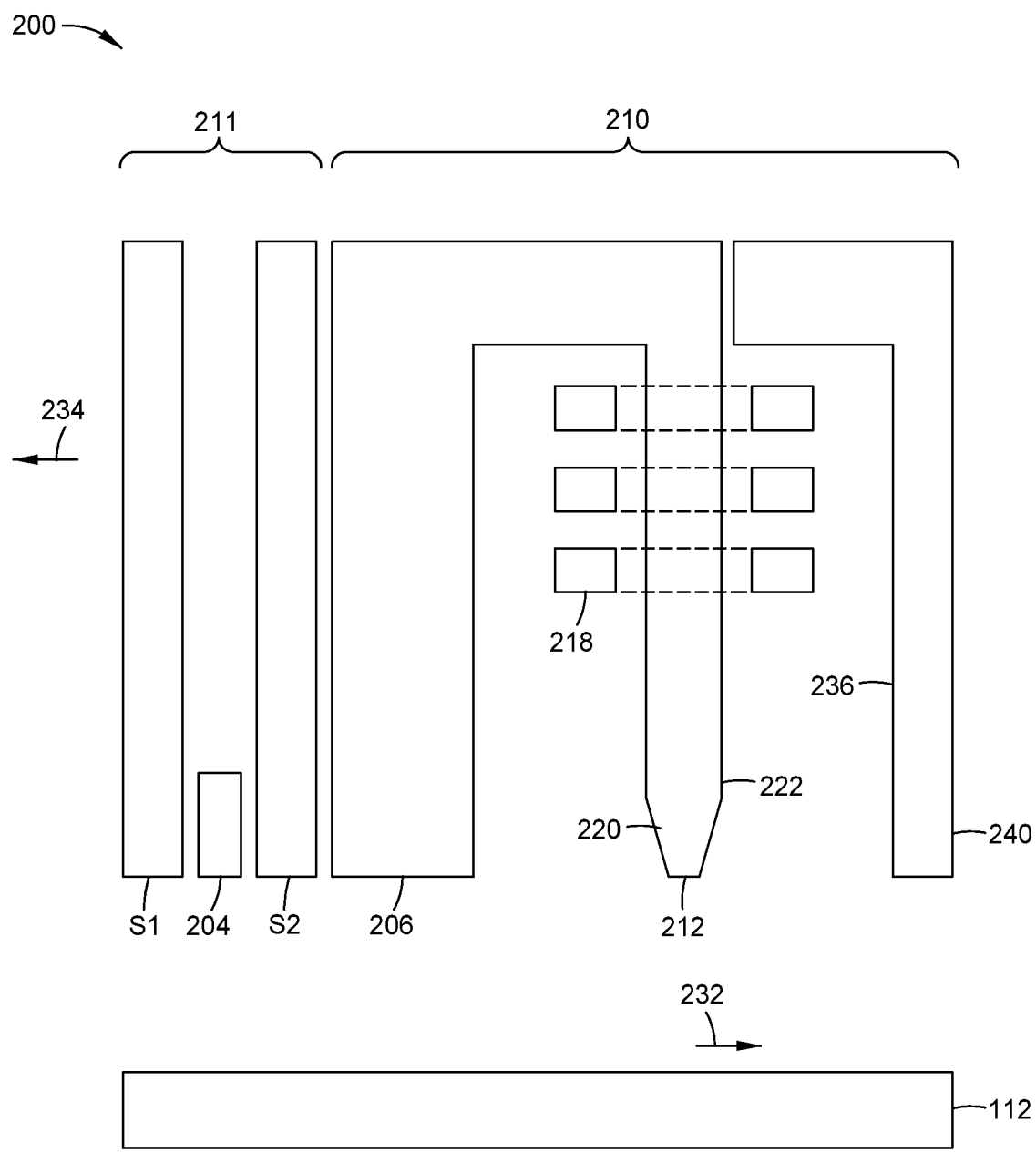
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe and Ni. The trailing shield 240 may be a magnetic material such as NiFe alloy. In one embodiment, the trailing shield 240 has an Ms of about 1.2 T to about 1.6 T.

Figure 3A:
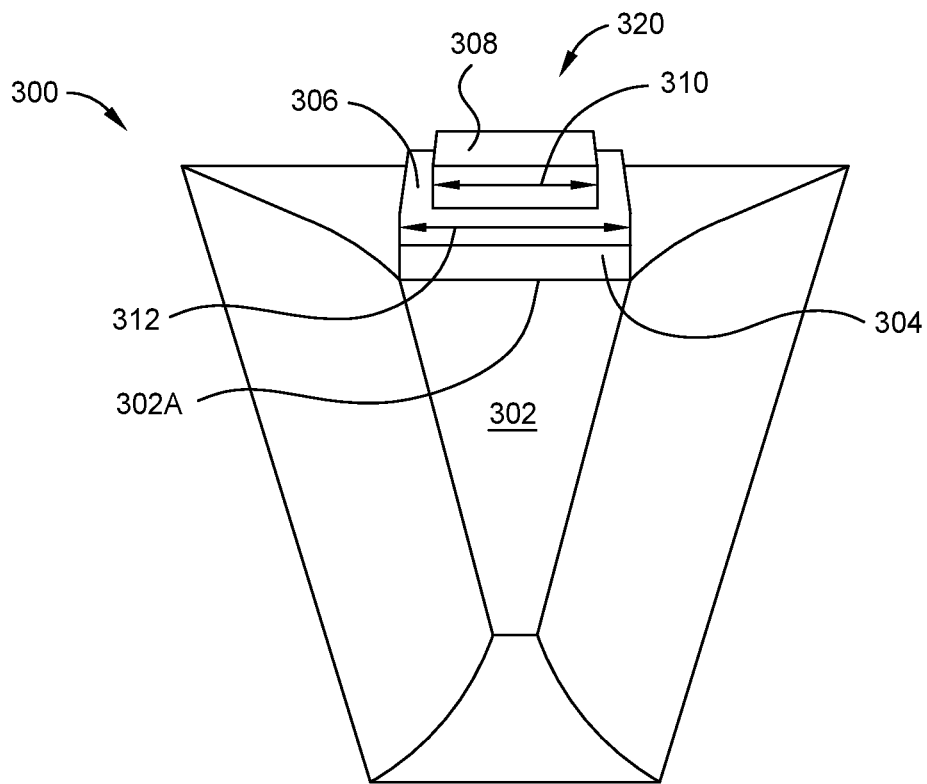
FIGS. 3A-3C illustrate various views of a magnetic recording head, according to one embodiment.
Figure 3B:
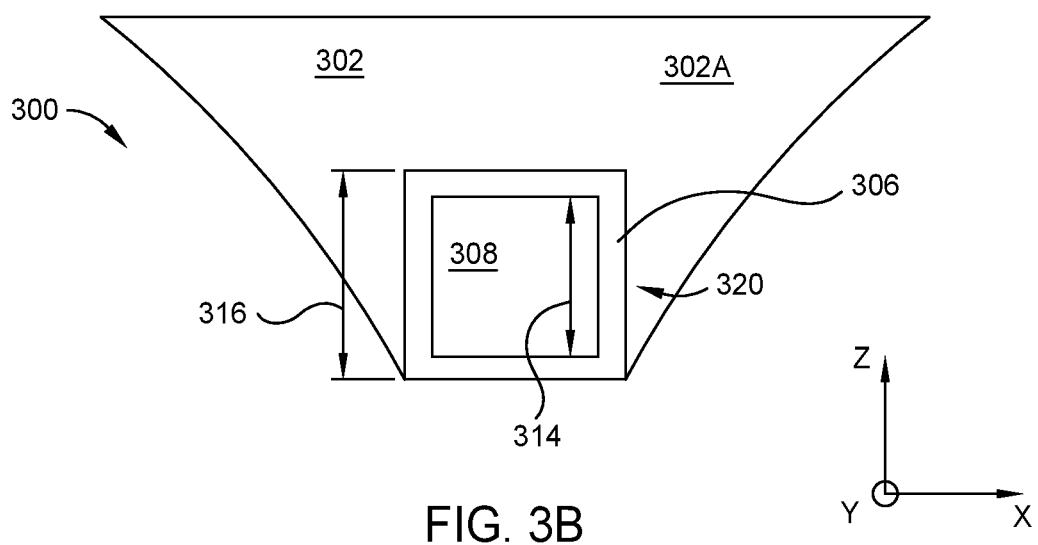
Figure 3C:
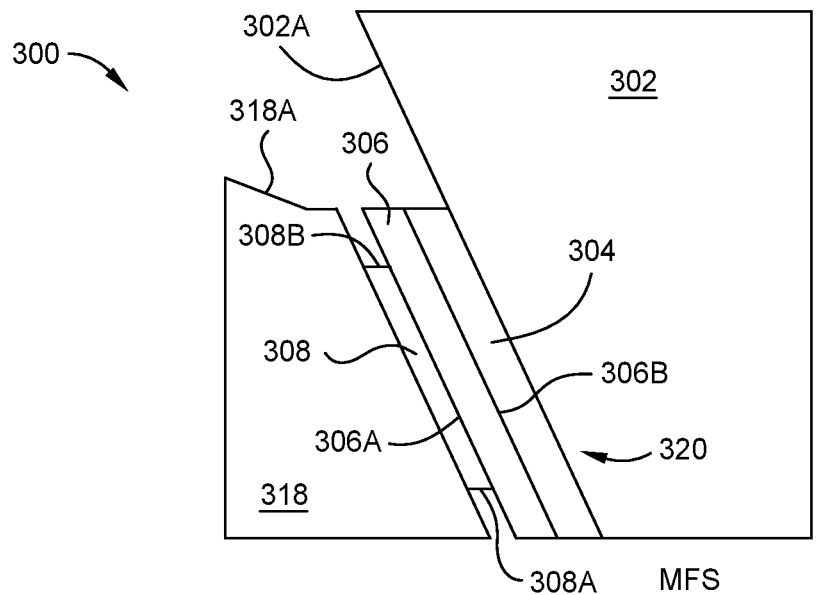

FIGS. 3A-3C illustrate various views of a magnetic recording head 300, according to one embodiment. FIG. 3A illustrates a perspective MFS view of the magnetic recording head 300, FIG. 3B illustrates a top view of an EAMR stack 320 or STL of the magnetic recording head 300, and FIG. 3C illustrates a cross-sectional view through the magnetic recording head 300. The magnetic recording head 300 may correspond to the magnetic head assembly 121 described in FIG. 1 and/or the read/write head 200 described in FIG. 2.

The magnetic recording head 300 comprises a main pole 302, an EAMR stack 320 disposed on the main pole 302, and a trailing shield 318 disposed on the EAMR stack 320. The trailing shield 318 may comprise a hot seed layer or notch layer (not shown) disposed above and in contact with the EAMR stack 320. The EAMR stack 320 comprises a seed layer 304 disposed on the first surface 302A of the main pole 302, a spin torque layer (STL) 306 disposed on the seed layer 304, and a spacer layer 308 disposed on the STL 306. The spacer layer 308 has a first cross-track width 310 (i.e., the x-direction) that is less than a second cross-track width 312 of the STL 306, as shown in FIG. 3A. Additionally, the spacer layer 308 has a first width in the stripe height direction 314 (i.e., the z-direction) that is less than a second width in the stripe height direction 316 of the STL 306, as shown in FIG. 3B.

The spacer layer 308 and the STL 306 have the same shape (e.g., square); however, the spacer layer 308 is smaller in size and area than the STL 306. Thus, the first cross-track width 310 of the spacer layer 308 is equal to the first width in the stripe height direction 314, and the second cross-track width 312 of the STL 306 is equal to the second width in the stripe height direction 316. As shown in FIGS. 3B and 3C, the spacer layer 308 is centered on the STL 306 in both the cross-track direction (i.e., the x-direction) and the stripe height direction (i.e., the z-direction). In one embodiment, the STL 306 has a second cross-track width 312 greater than the first cross-track width 310 of the spacer layer 308 by about 12 nm to about 20 nm, and a second width in the stripe height direction 316 greater than the first width in the stripe height direction 314 by about 12 nm to about 20 nm. In other words, the spacer layer 308 is centered on the STL 306 such that the STL 306 is exposed and a border or overhang of the STL 306 of about 6 nm to about 10 nm is disposed on each side of the spacer layer 308.

Furthermore, as shown in FIG. 3C, a first surface 308A of the spacer layer 308 is recessed from the MFS while the STL 306, the seed layer 304, the main pole 302, and the trailing shield 318 are disposed at the MFS. Because the first surface 308A of the spacer layer 308 is recessed from the MFS and has a smaller size than the STL 306, a portion of the STL 306 at the MFS is exposed or uncovered by the spacer layer 308. A second surface 308B of the spacer layer 308 disposed opposite the first surface 308A is recessed from a first surface 318A of the trailing shield 318 while the STL 306 and the seed layer 304 are aligned with the first surface 318A of the trailing shield 318.

Reducing the cross-section area of the spacer layer 308 results in the current density being locally enhanced at a first surface 306A of the STL 306 in contact with the spacer layer 308 (i.e., the interface of the spacer layer 308 and the STL 306). The spin torque in the STL 306 can quickly switch the magnetization of the first surface 306A of the STL 306, and then switch a second surface 306B of the STL 306 (i.e., the interface of the STL 306 and the seed layer 304) through exchange coupling. As such, the switching of the STL 306 is faster and more complete than that of a conventional EAMR stack comprising an STL and a spacer layer having the same cross-section area. Moreover, the reduced cross-section area of the spacer layer 308 results in the ADC of the magnetic recording head 300 being improved as well as the performance degradation of the magnetic recording head 300 being reduced.

Figure 4A:
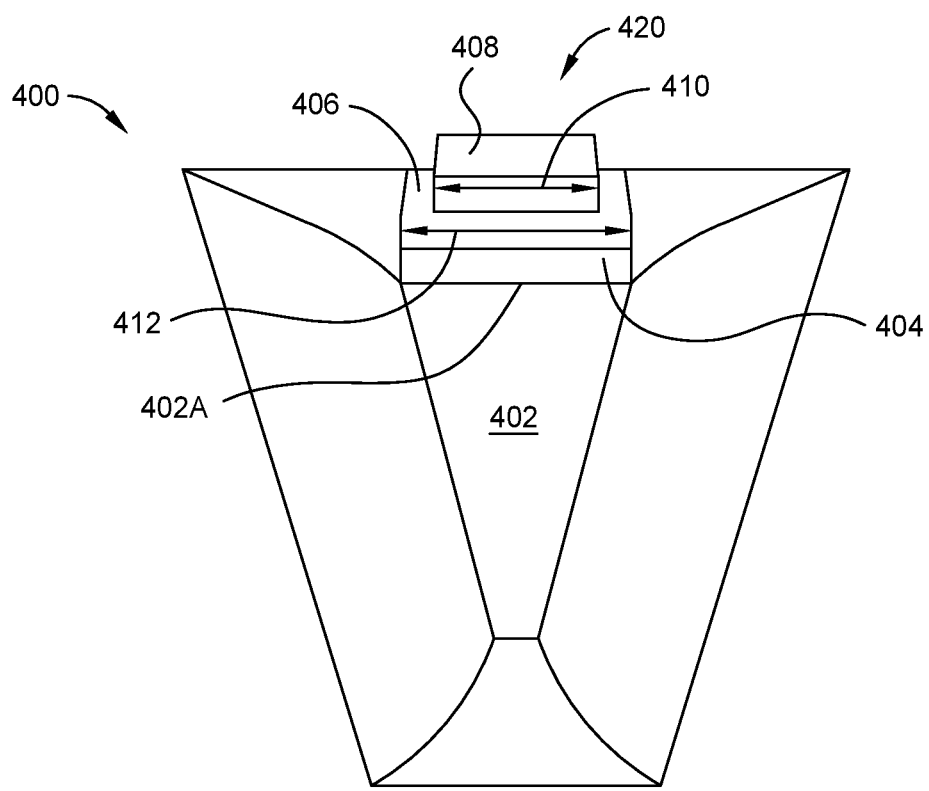
FIGS. 4A-4C illustrate various views of a magnetic recording head, according to another embodiment.
Figure 4B:
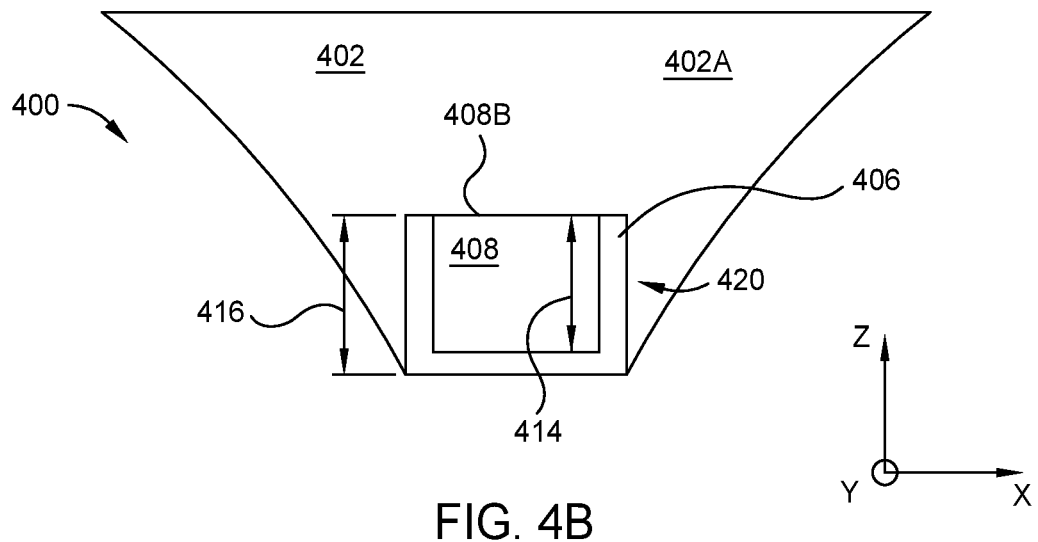
Figure 4C:
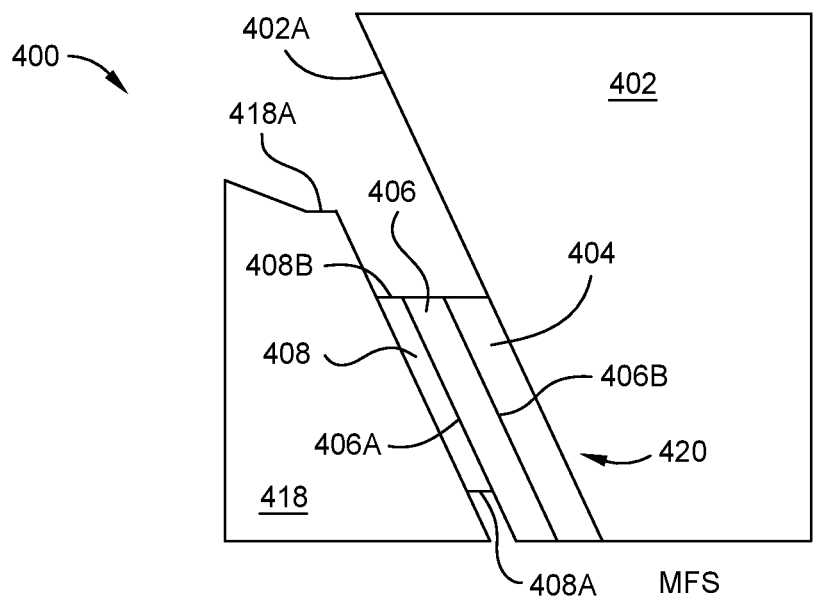

FIGS. 4A-4C illustrate various views of a magnetic recording head 400, according to another embodiment. FIG. 4A illustrates a perspective MFS view of the magnetic recording head 400, FIG. 4B illustrates a top view of an EAMR stack 420 of the magnetic recording head 400, and FIG. 4C illustrates a cross-sectional view through the magnetic recording head 400. The magnetic recording head 400 may correspond to the magnetic head assembly 121 described in FIG. 1 and/or the read/write head 200 described in FIG. 2.

The magnetic recording head 400 comprises a main pole 402, an EAMR stack 420 disposed on the main pole 402, and a trailing shield 418 disposed on the EAMR stack 420. The trailing shield 418 may comprise a hot seed layer or notch layer (not shown) disposed above and in contact with the EAMR stack 420. The EAMR stack 420 comprises a seed layer 404 disposed on the first surface 402A of the main pole 402, an STL 406 disposed on the seed layer 404, and a spacer layer 408 disposed on the STL 406. The spacer layer 408 has a first cross-track width 410 (i.e., the x-direction) that is less than a second cross-track width 412 of the STL 406, as shown in FIG. 4A. Additionally, the spacer layer 408 has a first width in the stripe height direction 414 (i.e., the z-direction) that is less than a second width in the stripe height direction 416 of the STL 406, as shown in FIG. 4B.

The spacer layer 408 and the STL 406 have the same shape (e.g., rectangular); however, the spacer layer 408 is smaller in size and area than the STL 406. Thus, the first cross-track width 410 of the spacer layer 408 is greater than the first width in the stripe height direction 414, and the second cross-track width 412 of the STL 406 is greater than the second width in the stripe height direction 416. As shown in FIGS. 4B and 4C, a second surface 408B of the spacer layer 408 disposed opposite the MFS is aligned and conformal with a surface of the STL 406 disposed opposite the MFS. The spacer layer 408 is centered on the STL 406 in the cross-track direction (i.e., the x-direction).

In one embodiment, the STL 406 has a second cross-track width 412 greater than the first cross-track width 410 of the spacer layer 408 by about 12 nm to about 20 nm, and a second width in the stripe height direction 416 greater than the first width in the stripe height direction 414 by about 6 nm to about 10 nm. In other words, the spacer layer 408 is centered on the STL 406 such that the STL 406 is exposed and a border or overhang of the STL 406 of about 6 nm to about 10 nm is disposed on each side of the spacer layer 408 except the second surface 408B, as the second surface 408B of the spacer layer 408 is conformal with the surface of the STL 406 opposite the MFS.

Furthermore, as shown in FIG. 4C, a first surface 408A of the spacer layer 408 is recessed from the MFS while the STL 406, the seed layer 404, the main pole 402, and the trailing shield 418 are disposed at the MFS. Because the first surface 408A of the spacer layer 408 is recessed from the MFS, a portion of the STL 406 at the MFS is exposed or uncovered by the spacer layer 408. A second surface 408B of the spacer layer 408 disposed opposite the first surface 408A is recessed from a first surface 418A of the trailing shield 418, and the STL 406 and the seed layer 404 are aligned or conformal with the second surface 408B of the spacer layer 408. The second surface 408B of the spacer layer 408 may be recessed from the first surface 418A of the trailing shield 418 by a distance of about 7 nm.

Reducing the cross-section area of the spacer layer 408 results in the current density being locally enhanced at a first surface 406A of the STL 406 in contact with the spacer layer 408 (i.e., the interface of the spacer layer 408 and the STL 406). The spin torque in the STL 406 can quickly switch the magnetization of the first surface 406A of the STL 406, and then switch a second surface 406B of the STL 406 (i.e., the interface of the STL 406 and the seed layer 404) through exchange coupling. As such, the switching of the STL 406 is faster and more complete than that of a conventional EAMR stack comprising an STL and a spacer layer having the same cross-section area. Moreover, the reduced cross-section area of the spacer layer 408 results in the ADC of the magnetic recording head 400 being improved as well as the performance degradation of the magnetic recording head 400 being reduced.

Figure 5A:
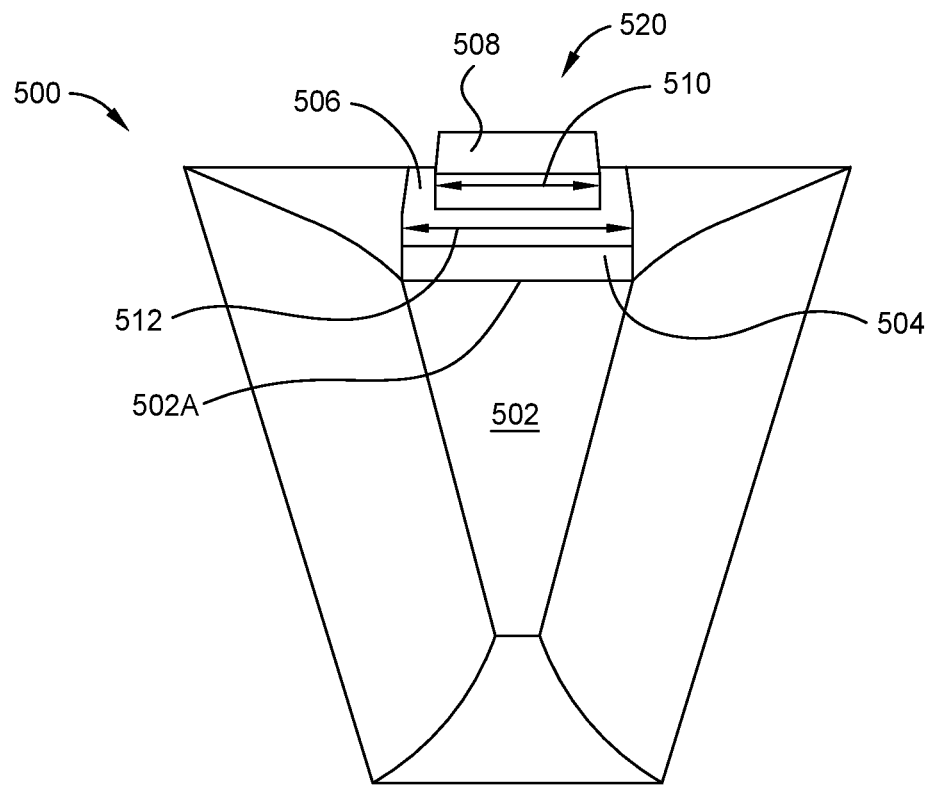
FIGS. 5A-5C illustrate various views of a magnetic recording head, according to yet another embodiment.
Figure 5B:
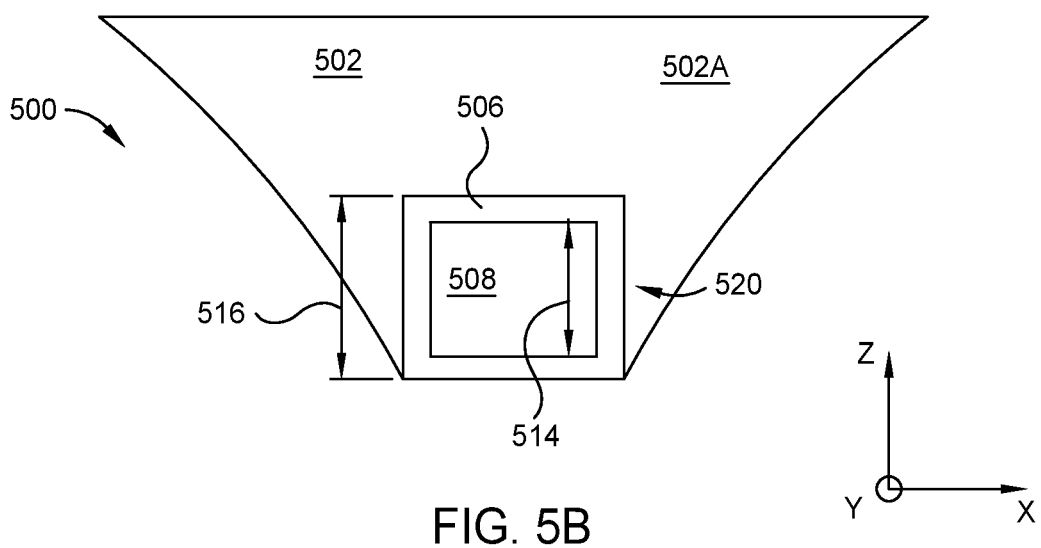
Figure 5C:
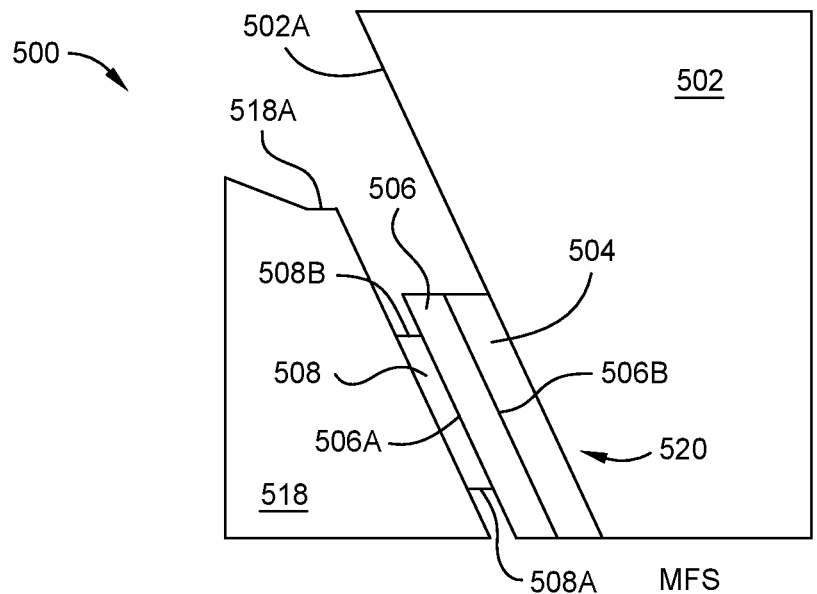

FIGS. 5A-5C illustrate various views of a magnetic recording head 500, according to one embodiment. FIG. 5A illustrates a perspective MFS view of the magnetic recording head 500, FIG. 5B illustrates a top view of an EAMR stack 520 of the magnetic recording head 500, and FIG. 5C illustrates a cross-sectional view through the magnetic recording head 500. The magnetic recording head 500 may correspond to the magnetic head assembly 121 described in FIG. 1 and/or the read/write head 200 described in FIG. 2.

The magnetic recording head 500 comprises a main pole 502, an EAMR stack 520 disposed on the main pole 502, and a trailing shield 518 disposed on the EAMR stack 520. The trailing shield 518 may comprise a hot seed layer or notch layer (not shown) disposed above and in contact with the EAMR stack 520. The EAMR stack 520 comprises a seed layer 504 disposed on the first surface 502A of the main pole 502, an STL 506 disposed on the seed layer 504, and a spacer layer 508 disposed on the STL 506. The spacer layer 508 has a first cross-track width 510 (i.e., the x-direction) that is less than a second cross-track width 512 of the STL 506, as shown in FIG. 5A. Additionally, the spacer layer 508 has a first width in the stripe height direction 514 (i.e., the z-direction) that is less than a second width in the stripe height direction 516 of the STL 506, as shown in FIG. 5B.

The spacer layer 508 and the STL 506 have the same shape (e.g., rectangular); however, the spacer layer 508 is smaller in size and area than the STL 506. Thus, the first cross-track width 510 of the spacer layer 508 is greater than the first width in the stripe height direction 514, and the second cross-track width 512 of the STL 506 is greater than the second width in the stripe height direction 516 and the first cross-track width 510. As shown in FIGS. 5B and 5C, the spacer layer 508 is centered on the STL 506 in both the cross-track direction (i.e., the x-direction) and the stripe height direction (i.e., the z-direction). In one embodiment, the STL 506 has a second cross-track width 512 greater than the first cross-track width 510 of the spacer layer 508 by about 12 nm to about 20 nm, and a second width in the stripe height direction 516 greater than the first width in the stripe height direction 514 by about 12 nm to about 20 nm. In other words, the spacer layer 508 is centered on the STL 506 such that the STL 506 is exposed and a border or overhang of the STL 506 of about 6 nm to about 10 nm is disposed on each side of the spacer layer 508.

Furthermore, as shown in FIG. 5C, a first surface 508A of the spacer layer 508 is recessed from the MFS while the STL 506, the seed layer 504, the main pole 502, and the trailing shield 518 are disposed at the MFS. Because the first surface 508A of the spacer layer 508 is recessed from the MFS and has a smaller size than the STL 506, a portion of the STL 506 at the MFS is exposed or uncovered by the spacer layer 508. A second surface 508B of the spacer layer 508 disposed opposite the first surface 508A is recessed from a first surface 518A of the trailing shield 518 by a first distance of about 7 nm. The STL 506 and the seed layer 504 are recessed from the first surface 518A of the trailing shield 518 by a second distance of about 10 nm (i.e., the second distance of the STL 506 and the seed layer 504 is less than the first distance of the spacer layer 508).

Reducing the cross-section area of the spacer layer 508 results in the current density being locally enhanced at a first surface 506A of the STL 506 in contact with the spacer layer 508 (i.e., the interface of the spacer layer 508 and the STL 506). The spin torque in the STL 506 can quickly switch the magnetization of the first surface 506A of the STL 506, and then switch a second surface 506B of the STL 506 (i.e., the interface of the STL 506 and the seed layer 504) through exchange coupling. As such, the switching of the STL 506 is faster and more complete than that of a conventional EAMR stack comprising an STL and a spacer layer having the same cross-section area. Moreover, the reduced cross-section area of the spacer layer 508 results in the ADC of the magnetic recording head 500 being improved as well as the performance degradation of the magnetic recording head 500 being reduced.

Figure 6A:
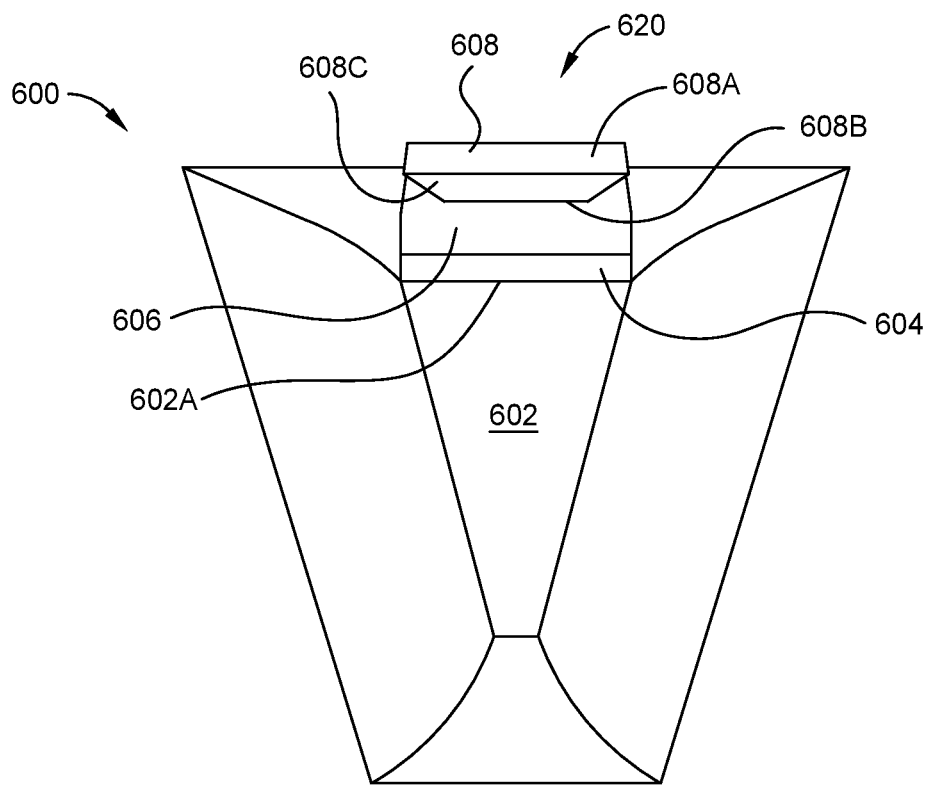
Figure 6B:
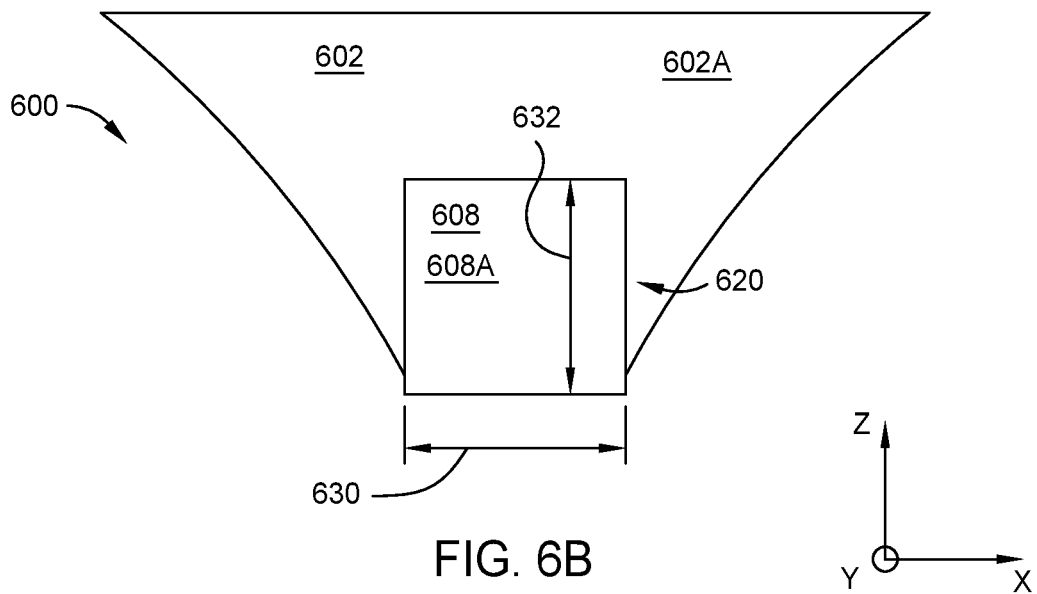
Figure 6C:
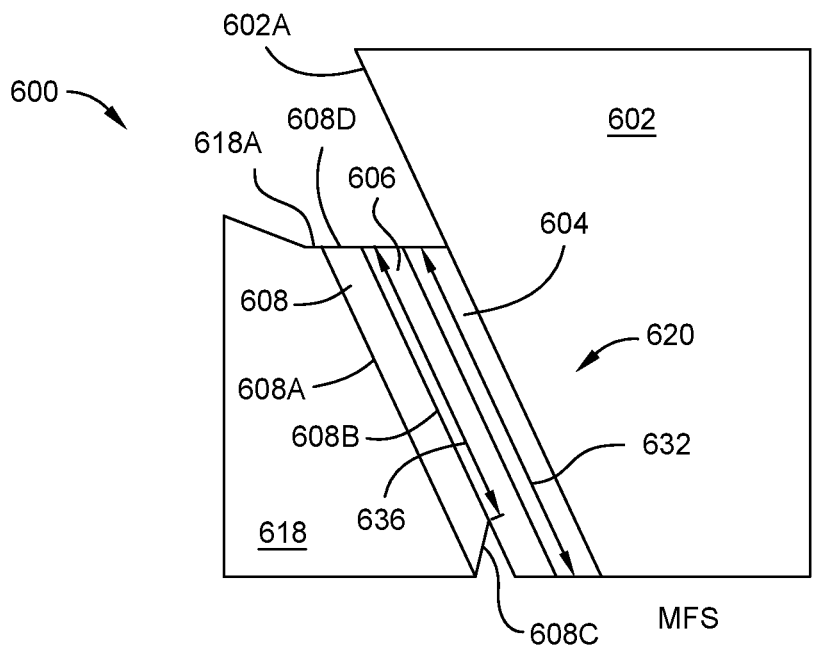

FIGS. 6A-6D illustrate various views of a magnetic recording head 600, according to another embodiment. FIG. 6A illustrates a perspective MFS view of the magnetic recording head 600, FIG. 6B illustrates a top view of an EAMR stack 620 of the magnetic recording head 600, and FIG. 6C illustrates a cross-sectional view through the magnetic recording head 600. FIG. 6D illustrates a close-up MFS view of the magnetic recording head 600. The magnetic recording head 600 may correspond to the magnetic head assembly 121 described in FIG. 1 and/or the read/write head 200 described in FIG. 2.

The magnetic recording head 600 comprises a main pole 602, an EAMR stack 620 disposed on the main pole 602, and a trailing shield 618 disposed on the EAMR stack 620. The trailing shield 618 may comprise a hot seed layer or notch layer (not shown) disposed above and in contact with the EAMR stack 620. The EAMR stack 620 comprises a seed layer 604 disposed on the first surface 602A of the main pole 602, an STL 606 disposed on the seed layer 604, and a spacer layer 608 disposed on the STL 606. The spacer layer 608 has a trapezoidal shape.

The spacer layer 608 has a square-trapezoidal shape such that a first surface 608A of the spacer layer 608 is disposed opposite a second surface 608B of the spacer layer 608, and the first surface 608A is connected to the second surface 608B through a third surface 608C that is angled. The first surface 608A is disposed adjacent to and in contact with the trailing shield 618. The second surface 608B is disposed adjacent to and in contact with the STL 606. The first surface 608A has a greater size and area than the second surface 608B. The third surface 608C faces the MFS. A first interface of the third surface 608C and the first surface 608A is disposed at the MFS while a second interface of the third surface 608C and the second surface 608B is recessed from the MFS, as shown in FIG. 6C.

As shown in FIG. 6D, the first surface 608A of the spacer layer 608 has a first cross-track width 630 (i.e., the x-direction) that is greater than a second cross-track width 634 of the second surface 608B of the spacer layer 608. The first cross-track width 630 is equal to a cross-track width of the STL 606 and the seed layer 604. Additionally, the first surface 608A of the spacer layer 608 has a first width in the stripe height direction 632 (i.e., the z-direction) that is greater than a second width in the stripe height direction 636 of the second surface 608B of the spacer layer 608, as shown in FIG. 6C. The first width in the stripe height direction 632 is equal to a width in the stripe height direction of the STL 606 and the seed layer 604. The first cross-track width 630 may be equal to the first width in the stripe height direction 632, and the second cross-track width 634 may be equal to the second width in the stripe height direction 636. Thus, at least the second surface 608B of the spacer layer 608 has a reduced or smaller area than the STL 606.

Because the second surface 608B of the spacer layer 608 has a smaller size and area than the STL 606, as shown in FIG. 6D, portions of a first surface 606A of the STL 606 are exposed or uncovered by the spacer layer 608. In one embodiment, three portions of the first surface 606A of the STL 606 are exposed. In one embodiment, the STL 606 has a first cross-track width 630 greater than the second cross-track width 634 of the second surface 608B of the spacer layer 608 by about 12 nm to about 20 nm, and a first width in the stripe height direction 632 greater than the second width in the stripe height direction 636 by about 12 nm to about 20 nm. As such, the exposed portions of the STL 606 may have a thickness of about 6 nm to about 10 nm.

Furthermore, as shown in FIG. 6C, the second surface 608B of the spacer layer 608 is recessed from the MFS while the first surface 608A of the spacer layer 608, the STL 606, the seed layer 604, the main pole 602, and the trailing shield 618 are disposed at the MFS. A fourth surface 608D of the spacer layer 608 disposed opposite the third surface 608C is conformal or aligned with a first surface 618A of the trailing shield 618. The STL 606 and the seed layer 604 are conformal or aligned with the first surface 618A of the trailing shield 618 and the fourth surface 608D of the spacer layer 608. Thus, the fourth surface 608D of the spacer layer 608 may be flat, like the first surface 608A and the second surface 608B, rather than angled like the third surface 608C.

Reducing the cross-section area of the second surface 608B of the spacer layer 608 results in the current density being locally enhanced at a first surface 606A of the STL 606 in contact with the spacer layer 608 (i.e., the interface of the spacer layer 608 and the STL 606). The spin torque in the STL 606 can quickly switch the magnetization of the first surface 606A of the STL 606, and then switch a second surface 606B of the STL 606 (i.e., the interface of the STL 606 and the seed layer 604) through exchange coupling. As such, the switching of the STL 606 is faster and more complete than that of a conventional EAMR stack comprising an STL and a spacer layer having the same cross-section area. Moreover, the reduced cross-section area of the spacer layer 608 results in the ADC of the magnetic recording head 600 being improved as well as the performance degradation of the magnetic recording head 600 being reduced.

Figure 7A:
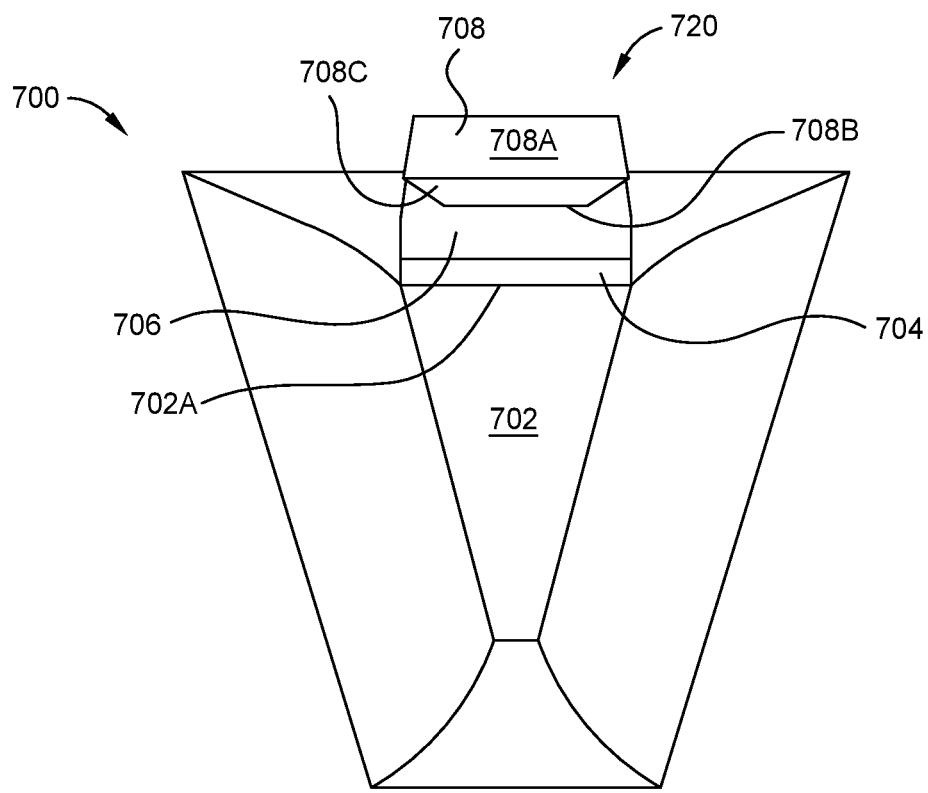
FIGS. 7A-7D illustrate various views of a magnetic recording head, according to yet another embodiment.
Figure 7B:
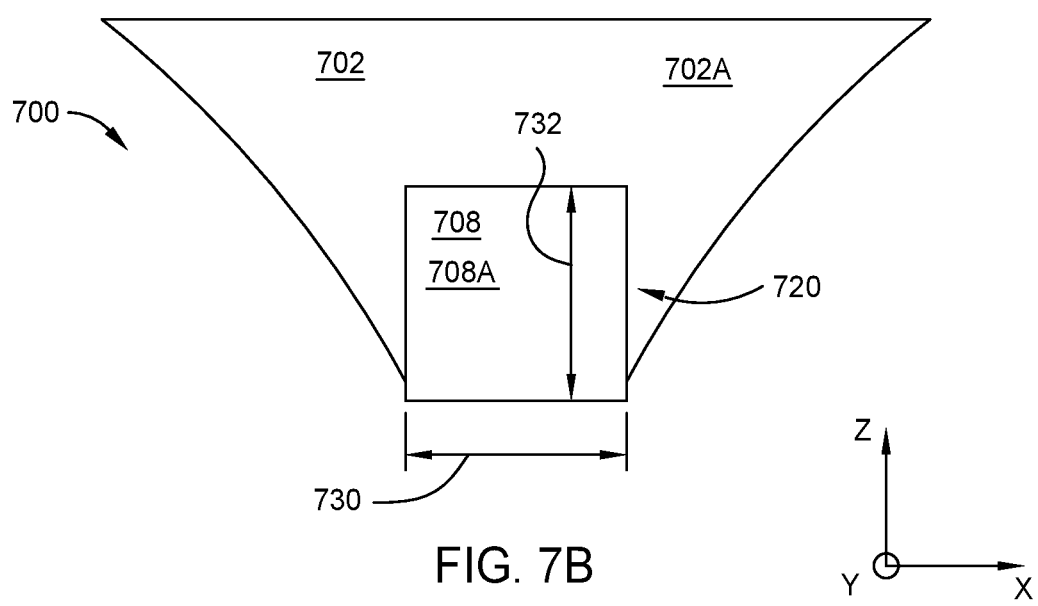
Figure 7C:
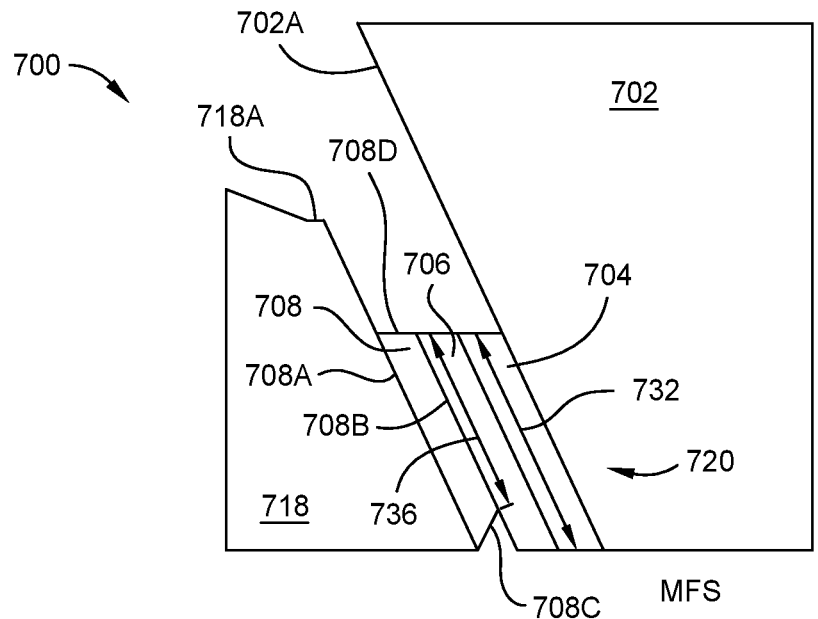
Figure 7D:
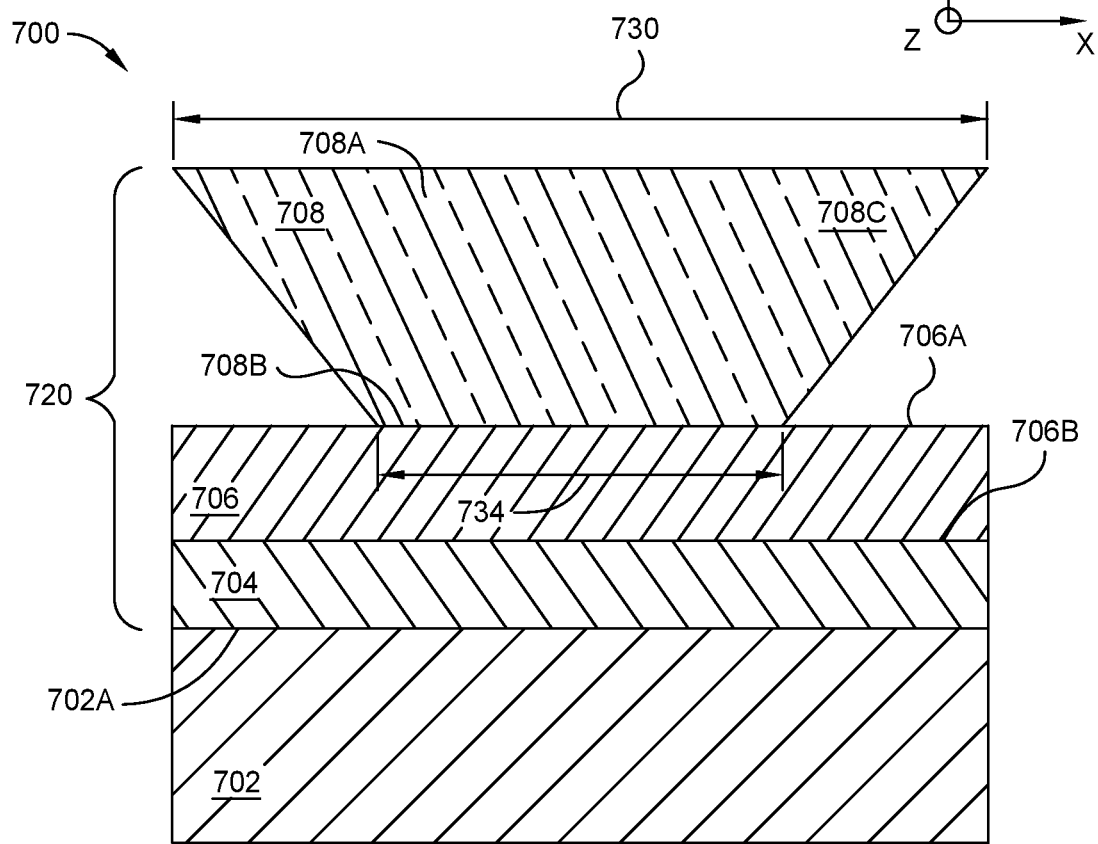

FIGS. 7A-7D illustrate various views of a magnetic recording head 700, according to yet another embodiment. FIG. 7A illustrates a perspective MFS view of the magnetic recording head 700, FIG. 7B illustrates a top view of an EAMR stack 720 of the magnetic recording head 700, and FIG. 7C illustrates a cross-sectional view through the magnetic recording head 700. FIG. 7D illustrates a close-up MFS view of the magnetic recording head 700. The magnetic recording head 700 may correspond to the magnetic head assembly 121 described in FIG. 1 and/or the read/write head 200 described in FIG. 2.

The magnetic recording head 700 comprises a main pole 702, an EAMR stack 720 disposed on the main pole 702, and a trailing shield 718 disposed on the EAMR stack 720. The trailing shield 718 may comprise a hot seed layer or notch layer (not shown) disposed above and in contact with the EAMR stack 720. The EAMR stack 620 of FIGS. 6A-6D and the EAMR stack 720 of FIGS. 7A-7D comprise the same layers and overall shape; however, the EAMR stack 620 of FIGS. 6A-6D has a square-trapezoidal shape while the EAMR stack 720 of FIGS. 7A-7D has a rectangular-trapezoidal shape. In other words, the EAMR stack 620 of FIGS. 6A-6D has a greater width in the stripe height direction (i.e., the z-direction) than the EAMR stack 720 of FIGS. 7A-7D.

The EAMR stack 720 comprises a seed layer 704 disposed on the first surface 702A of the main pole 702, an STL 706 disposed on the seed layer 704, and a spacer layer 708 disposed on the STL 706. The spacer layer 708 has a trapezoidal shape. The spacer layer 708 has a rectangular-trapezoidal shape such that a first surface 708A of the spacer layer 708 is disposed opposite a second surface 708B of the spacer layer 708, and the first surface 708A is connected to the second surface 708B through a third surface 708C that is angled. The first surface 708A is disposed adjacent to and in contact with the trailing shield 718. The second surface 708B is disposed adjacent to and in contact with the STL 706. The first surface 708A has a greater size and area than the second surface 708B. The third surface 708C faces the MFS. A first interface of the third surface 708C and the first surface 708A is disposed at the MFS while a second interface of the third surface 708C and the second surface 608B is recessed from the MFS, as shown in FIG. 7C.

As shown in FIG. 7D, the first surface 708A of the spacer layer 708 has a first cross-track width 730 (i.e., the x-direction) that is greater than a second cross-track width 734 of the second surface 708B of the spacer layer 708. The first cross-track width 730 is equal to a cross-track width of the STL 706 and the seed layer 704. Additionally, the first surface 708A of the spacer layer 708 has a first width in the stripe height direction 732 (i.e., the z-direction) that is greater than a second width in the stripe height direction 736 of the second surface 708B of the spacer layer 708, as shown in FIG. 7C. The first width in the stripe height direction 732 is equal to a width in the stripe height direction of the STL 706 and the seed layer 704. The first cross-track width 730 may be greater than the first width in the stripe height direction 732, and the second cross-track width 734 may be greater than the second width in the stripe height direction 736. Thus, at least the second surface 708B of the spacer layer 708 has a reduced or smaller area than the STL 706.

Because the second surface 708B of the spacer layer 708 has a smaller size and area than the STL 706, as shown in FIG. 7D, portions of a first surface 706A of the STL 706 are exposed or uncovered by the spacer layer 708. In one embodiment, three portions of the first surface 706A of the STL 706 are exposed. In one embodiment, the STL 706 has a first cross-track width 730 greater than the second cross-track width 734 of the second surface 708B of the spacer layer 708 by about 12 nm to about 20 nm, and a first width in the stripe height direction 732 greater than the second width in the stripe height direction 736 by about 12 nm to about 20 nm. As such, the exposed portions of the STL 706 may have a thickness of about 6 nm to about 10 nm.

Furthermore, as shown in FIG. 7C, the second surface 708B of the spacer layer 708 is recessed from the MFS while the first surface 708A of the spacer layer 708, the STL 706, the seed layer 704, the main pole 702, and the trailing shield 718 are disposed at the MFS. A fourth surface 708D of the spacer layer 708 disposed opposite the third surface 708C is recessed from a first surface 718A of the trailing shield 718. The STL 706 and the seed layer 704 are conformal or aligned with the fourth surface 708D of the spacer layer 708 and are recessed from the first surface 718A of the trailing shield 718. The fourth surface 708D of the spacer layer 708 may be flat, like the first surface 708A and the second surface 708B, rather than angled like the third surface 708C.

Reducing the cross-section area of the second surface 708B of the spacer layer 708 results in the current density being locally enhanced at a first surface 706A of the STL 706 in contact with the spacer layer 708 (i.e., the interface of the spacer layer 708 and the STL 706). The spin torque in the STL 706 can quickly switch the magnetization of the first surface 706A of the STL 706, and then switch a second surface 706B of the STL 706 (i.e., the interface of the STL 706 and the seed layer 704) through exchange coupling. As such, the switching of the STL 706 is faster and more complete than that of a conventional EAMR stack comprising an STL and a spacer layer having the same cross-section area. Moreover, the reduced cross-section area of the spacer layer 708 results in the ADC of the magnetic recording head 700 being improved as well as the performance degradation of the magnetic recording head 700 being reduced.

In each of the magnetic recording heads 300, 400, 500, 600, 700, the seed layer 304, 404, 504, 604, 704 may comprise Cr, Ta, NiCr, NiTa, Ru, NiFeTa, NiAl, or combinations thereof. In each of the magnetic recording heads 300, 400, 500, 600, 700, the STL 306, 406, 506, 606, 706 may comprise NiFe, CMG, CoFe, NiFeCo, or combinations thereof. In each of the magnetic recording heads 300, 400, 500, 600, 700, the spacer layer 308, 408, 508, 608, 708 may comprise Cu, Ag, AgSn, or combinations thereof.

Therefore, magnetic recording heads comprising a spacer layer having at least one surface in contact with the STL that has a smaller or reduced area than the STL results in the current density being locally enhanced at the interface of the STL and the spacer layer. The locally enhanced current density allows the magnetization of the surface of the STL in contact with the spacer layer to be quickly and completely switched while further enabling the surface of the STL in contact with the seed layer to be efficiently switched through exchange coupling. As such, the transfer of the spin torque is more efficient, reducing the performance degradation at high bias currents and improving the areal density capability of the magnetic recording head.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

In one embodiment, a magnetic recording head comprises a main pole, a seed layer disposed on the main pole, a spin torque layer disposed on the seed layer, the spin torque layer having a first cross-track width, and a spacer layer disposed on the spin torque layer, the spacer layer having a second cross-track width less than the first cross-track width.

The spacer layer may have a square shape. The spacer layer may have a rectangular shape. A first surface of the spacer layer may be recessed from a media facing surface, and a first surface of the spin torque layer may be disposed at the media facing surface. A second surface of the spacer layer opposite the first surface and the media facing surface may be conformal or aligned with a second surface of the spin torque layer opposite the first surface and the media facing surface. The spacer layer may be centered on the spin torque layer such that a second surface of the spacer layer opposite the first surface and the media facing surface is unaligned or non-conformal with a second surface of the spin torque layer opposite the first surface and the media facing surface.

In another embodiment, a magnetic recording head comprises a main pole, a seed layer disposed on the main pole, a spin torque layer disposed on the seed layer, the spin torque layer having a first width in a stripe height direction, a spacer layer disposed on the spin torque layer, the spacer layer having a second width in a stripe height direction less than the first width in the stripe height direction, and a trailing shield disposed on the spacer layer.

A first surface of the trailing shield and a first surface of the spin torque layer may be disposed at a media facing surface, and a first surface of the spacer layer may be recessed from the media facing surface. A second surface of the spacer layer disposed opposite the first surface and the media facing surface may be recessed from a second surface of the trailing shield disposed opposite the first surface and the media facing surface. A second surface of the spin torque layer disposed opposite the first surface and the media facing surface may be aligned with the second surface of the trailing shield. A second surface of the spin torque layer disposed opposite the first surface and the media facing surface may be recessed from the second surface of the trailing shield. A second surface of the spin torque layer disposed opposite the first surface and the media facing surface may be conformal or aligned with the second surface of the spacer layer. The spacer layer and the spin torque layer may have the same shape.

In another embodiment, a magnetic recording head comprises a main pole, a seed layer disposed on the main pole, a spin torque layer disposed on the seed layer, and a spacer layer disposed on the spin torque layer, the spacer layer having a trapezoidal shape. A first surface of the spacer layer disposed adjacent to and in contact with the spin torque layer has a first cross-track width less than a second cross-track width of a second surface of the spacer layer disposed opposite the first surface of the spacer layer.

The spin torque layer may have the same second cross-track width as the second surface of the spacer layer. The first surface of the spacer layer may have a first width in a stripe height direction less than a second width in the stripe height direction of the second surface of the spacer layer. The spin torque layer may have the same second width in the stripe height direction as the second surface of the spacer layer. The spin torque layer may be disposed at a media facing surface, and the first surface of the spacer layer may be recessed from the media facing surface. The spacer layer may have a square-trapezoidal shape. The spacer layer may have a rectangular-trapezoidal shape.

While the foregoing is directed to embodiments of the present disclosure, other and further embodiments of the disclosure may be devised without departing from the basic scope thereof, and the scope thereof is determined by the claims that follow.

What is claimed is:
1. A magnetic recording head, comprising:
a main pole disposed at a media facing surface;
a seed layer disposed on the main pole, the seed layer being disposed at the media facing surface;

a spin torque layer disposed on the seed layer, the spin torque layer having a first cross-track width, wherein the spin torque layer is disposed at the media facing surface; and a spacer layer disposed on the spin torque layer, the spacer layer having a first surface recessed from a media facing surface.

2. The magnetic recording head of claim 1, wherein the spacer layer has a second cross-track width that is less than the first cross-track width.

3. The magnetic recording head of claim 1, wherein the spacer layer has a rectangular shape.

4. The magnetic recording head of claim 1, wherein a first surface of the spin torque layer is disposed at the media facing surface.

5. The magnetic recording head of claim 1, wherein the spin torque layer has a first stripe height, wherein the spacer layer has a second stripe height, and wherein the first stripe height is greater than the second stripe height.

6. The magnetic recording head of claim 1, wherein the spacer layer is centered on the spin torque layer such that a second surface of the spacer layer opposite the first surface and the media facing surface is unaligned or non-conformal with a second surface of the spin torque layer opposite the first surface and the media facing surface.

7. A data storage device comprising the magnetic recording head of claim 1.

8. A magnetic recording head, comprising:
a main pole;
a seed layer disposed on the main pole, the seed layer being disposed at a media facing surface;
a spin torque layer disposed on the seed layer, the spin torque layer having a first height in a stripe height direction, wherein a first surface of the spin torque layer is disposed at the media facing surface;
a spacer layer disposed on the spin torque layer, the spacer layer having a first surface and a second surface; and
a trailing shield disposed on the first surface of the spacer layer, wherein:
the second surface of the spacer layer is disposed on the spin torque layer, and
an end of the second surface is recessed from the media facing surface.

9. The magnetic recording head of claim 8, wherein a first surface of the trailing shield is disposed at the media facing surface, and wherein an end of the first surface of the spacer layer is disposed at the media facing surface.

10. The magnetic recording head of claim 9, wherein the spacer layer comprises a third surface connecting the first and second surfaces, wherein the third surface connects to the first surface at the media facing surface, and wherein the third surface connects to the second surface at a location recessed from the media facing surface.

11. The magnetic recording head of claim 8, wherein the first surface has a height that is equal to the first height of the spin torque layer in the stripe height direction.

12. The magnetic recording head of claim 8, wherein a second surface of the spin torque layer disposed opposite the media facing surface is aligned with at least a portion of a second surface of the trailing shield.

13. The magnetic recording head of claim 8, wherein a second surface of the spin torque layer disposed opposite the media facing surface is conformal or aligned with a surface of the spacer layer.

14. The magnetic recording head of claim 8, a surface of the seed layer that is opposite the media facing surface is at least partially aligned with a surface of the trailing shield that is opposite the media facing surface.

15. A data storage device comprising the magnetic recording head of claim 8.

16. A magnetic recording head, comprising:
a main pole;
a seed layer disposed on the main pole;
a spin torque layer disposed on the seed layer; and
a spacer layer disposed on the spin torque layer, the spacer layer having a trapezoidal shape, wherein:
a first surface of the spacer layer disposed adjacent to and in contact with the spin torque layer has a first cross-track width less than a second cross-track width of a second surface of the spacer layer disposed opposite the first surface of the spacer layer,
a surface of the spin torque layer opposite a media facing surface is aligned with a surface of the seed layer that is opposite the media facing surface,
the surface of the spin torque layer opposite the media facing surface is aligned with a surface of the spacer layer that is opposite the media facing surface, and
a cross-track width of the spin torque layer is equal to the second cross-track width of the second surface of the spacer layer.

17. The magnetic recording head of claim 16, wherein a third surface of the spacer layer is recessed from the media facing surface.

18. The magnetic recording head of claim 16, wherein a stripe height of the spin torque layer is equal to the second cross-track width of the second surface of the spacer layer.

19. The magnetic recording head of claim 16, wherein the spin torque layer is disposed at the media facing surface, and wherein the first surface of the spacer layer is recessed from the media facing surface.

20. A data storage device comprising the magnetic recording head of claim 16.

* * * * *